(12) United States Patent  (10) Patent No.: US 6,375,232 B1
Robinson  (45) Date of Patent: Apr. 23, 2002

(54) BI-METALLIC UNION FITTING FOR USE IN THREADED PORTS

(75) Inventor: Norman F. Robinson, Manhattan Beach, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/560,872

(22) Filed: Apr. 27, 2000

(51) Int. Cl.[7] ............................................. F16L 15/00
(52) U.S. Cl. .................. 285/220; 285/114; 285/219; 285/189; 285/113; 285/212; 228/113; 228/112.1
(58) Field of Search ................................ 285/220, 114, 285/219, 189, 113, 212; 228/113, 112.1

(56) References Cited

U.S. PATENT DOCUMENTS

| 1,122,422 A | * | 12/1914 | Ross ........................ 29/890.14 |
| 3,003,795 A | * | 10/1961 | Lyon .......................... 285/212 |
| 3,101,206 A | * | 8/1963 | Franck ........................ 285/220 |
| 3,106,413 A | * | 10/1963 | Hamlin et al. ............... 285/212 |
| 3,145,035 A | * | 8/1964 | Hanback ...................... 285/110 |
| 3,606,358 A | * | 9/1971 | Tobler ......................... 277/644 |
| 3,730,563 A | * | 5/1973 | Hanback et al. ............ 285/114 |
| 3,850,456 A | * | 11/1974 | Hanback et al. ............ 285/114 |
| 4,538,835 A |   | 9/1985 | Sundholm ..................... 285/12 |
| 4,934,742 A |   | 6/1990 | Williamson ................. 285/212 |
| 5,050,843 A |   | 9/1991 | Brooks ........................ 277/362 |
| 5,137,202 A | * | 8/1992 | Purdy, III ................... 228/132 |
| 5,261,705 A |   | 11/1993 | Takahashi et al. .......... 285/197 |
| 5,433,489 A |   | 7/1995 | Kimura et al. .............. 285/220 |
| 5,533,764 A |   | 7/1996 | Williamson ................. 285/212 |
| 5,992,904 A |   | 11/1999 | Hitachi et al. .............. 285/332 |

\* cited by examiner

*Primary Examiner*—Katherine A. Matecki
*Assistant Examiner*—Carlos Lugo
(74) *Attorney, Agent, or Firm*—Harness Dickey & Pierce P.L.C.

(57) ABSTRACT

A lip seal union fitting attaches to a female boss associated with a hydraulic component. The female boss includes a bore, a first threaded portion located on an inner surface of the bore and a seat. A body of the lip seal union fitting is constructed of a first material and includes a tube-side end, a boss-side end, and a central portion. A second threaded portion is located on an outer surface of the boss-side end. A lip seal is constructed of a second material. The lip seal extends from the central portion of the body towards the boss-side end. The lip seal includes an outer surface that engages the seat of the boss to create a fluid seal as the first and second threaded portions are rotatably engaged. The first material has a greater material hardness than the second material. The first material includes at least one of steel, stainless steel, an titanium alloy and the second material includes at least one of aluminum and aluminum alloy. The lip seal is attached to the body using inertia welding. Finish machining is performed on an outer surface of the lip seal. An anodic or cadmium plate finish is applied to the lip seal to prevent corrosion.

20 Claims, 2 Drawing Sheets

BI-METALLIC UNION FITTING FOR USE IN THREADED PORTS

TECHNICAL FIELD

This invention relates to union fittings. More particularly, this invention relates to lip seal union fittings for control valves, hydraulic cylinders, reservoirs, manifolds, and other hydraulic applications.

BACKGROUND OF THE INVENTION

Hydraulic components such as pumps, reservoirs, control valves, manifolds, hydraulic cylinders, and other hydraulic applications employ straight thread port connections and tapered pipe-thread port connections. Straight thread port connections are typically called boss ports or bosses.

Straight-thread bosses include a chamfered face surface or seat and a threaded bore. The union fitting includes a body with a threaded tube-side end, a threaded boss-side end, and a central portion with a hexagonal outer surface for engaging a wrench. To connect a tube to the boss, the boss-side end of the union fitting is inserted into the threaded bore of the boss. A cavity is formed at an interface between the seat of the boss and the boss-side end of the union fitting. An elastomeric O-ring is installed over the boss-side end and is moved against the central portion. As the union fitting is tightened, the elastomeric O-ring distorts and fills the cavity to create a fluid seal.

The elastomeric O-ring is distorted as the union fitting is tightened onto the boss. The strain on the elastomeric O-ring causes accelerated aging which, in turn, causes early O-ring failures. During use, the cyclical application and release of fluid pressure further contributes to the deterioration of the O-ring. In high pressure or high temperature applications, the elastomeric O-ring undergoes further wear and tends to lose the fluid-tight seal more quickly. Despite the problems associated with union fittings which employ elastomeric O-rings, the aerospace industry still uses them pervasively.

Various different union fittings have been proposed to eliminate the problems associated with elastomeric O-rings. A lip seal union fitting includes a metal lip that is integrally formed with the body of the fitting. The metal lip extends from the central portion and contacts the chamfered face surface or seat of the boss as the fitting is tightened. The integral metal lip has sufficient flexibility to overcome the lack of roundness or concentricity of either the boss or the union fitting. The integral lip seal provides a continuous metal-to-metal seal when the lip seal union fitting is tightened onto the boss. The lip seal union fitting is typically made of aluminum alloy, steel, or titanium alloy.

In some applications, however, steel hydraulic tubes are employed. The lip seal union fitting cannot be made from aluminum alloy because of galvanic corrosion coupling that occurs when dissimilar metals are in contact and because of strength and fatigue resistance issues. If the union fitting is made of steel, stainless steel or titanium alloy, the flexibility of the integral metal lip is reduced and the weight of the union fitting is increased. Successful applications of lip seal union fittings generally require that the boss be constructed of a material which is at least as hard as the material used in constructing the union fitting. Most of the bosses into which the union fittings are assembled are made of aluminum or aluminum alloy. Aluminum alloy, steel and stainless steel may also be used for the boss. Therefore, the metal used for the union fitting should not be harder than aluminum or aluminum alloy. Otherwise, the union fitting (which is a less expensive part) may damage the boss (which is the more expensive part) if the connection between the union fitting and the boss is over-tightened.

Some conventional union fittings with integral metal lips were made from titanium alloy which is the next most flexible metal after aluminum. When titanium alloy is employed, slight flexing of the integral metal lip occurs with each pressure application. Eventually, the flexing causes galling at a contact ring between the boss and the union fitting. The galling allows fluid leakage. Corrective actions involve reworking a cavity between the metal lip and a shank of the union fitting and installing an elastomeric O-ring as a redundant seal.

SUMMARY OF THE INVENTION

A lip seal union fitting according to the invention connects to a female boss that is associated with a hydraulic component. The female boss includes a bore, a first threaded portion located on an inner surface of the bore, and a seat. The lip seal union fitting includes a body that is constructed of a first material. The body includes a tube-side end, a boss-side end, and a central portion. A second threaded portion is located on an outer surface of the boss-side end. A lip seal is constructed of a second material. The lip seal is attached to and extends from the central portion of the body towards the boss-side end. The lip seal includes an outer surface that engages the seat of the boss to create a fluid seal as the first and second threaded portions are rotatably engaged. The first material has a greater material hardness than the second material.

In one feature of the invention, the lip seal is attached to the central portion using inertia welding.

In another feature of the invention, the boss is made of a third material. The second material has a hardness that is approximately equal to the third material.

In another feature of the invention, the first material includes at least one of steel, stainless steel, and titanium alloy. The second material includes at least one of aluminum and aluminum alloy.

In still another feature of the invention, the lip seal is cantilevered from the central portion. The central portion includes a first flange that projects in a radial direction from the body and a second flange that projects in an axial direction from a boss-side surface of the first flange. The lip seal is connected to the body along the second flange.

A method of making a lip seal union fitting according to the invention includes the step of constructing a body of the first material that has a bore-side end, a tube-side end, and a central portion. An outer surface of the boss-side end is threaded. A lip seal is constructed of a second material. A hardness of the first material is selected such that it is greater than a hardness of a second material. The lip seal is attached to the central portion of the body.

In another feature of the invention, the step of attaching includes the step of welding a part to the central portion. The part has an inner surface with a shape corresponding to a shape of an inner surface of the lip seal. An outer surface of the part is machined to form the lip seal. A finish is applied to the lip seal.

In still another feature of the invention, the central portion is provided with a first flange that projects in a radially outward direction from the body. An annular projection is formed on a boss-side surface of the first flange. The lip seal is attached to the annular projection.

Other objects, features, and advantages will be readily apparent.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
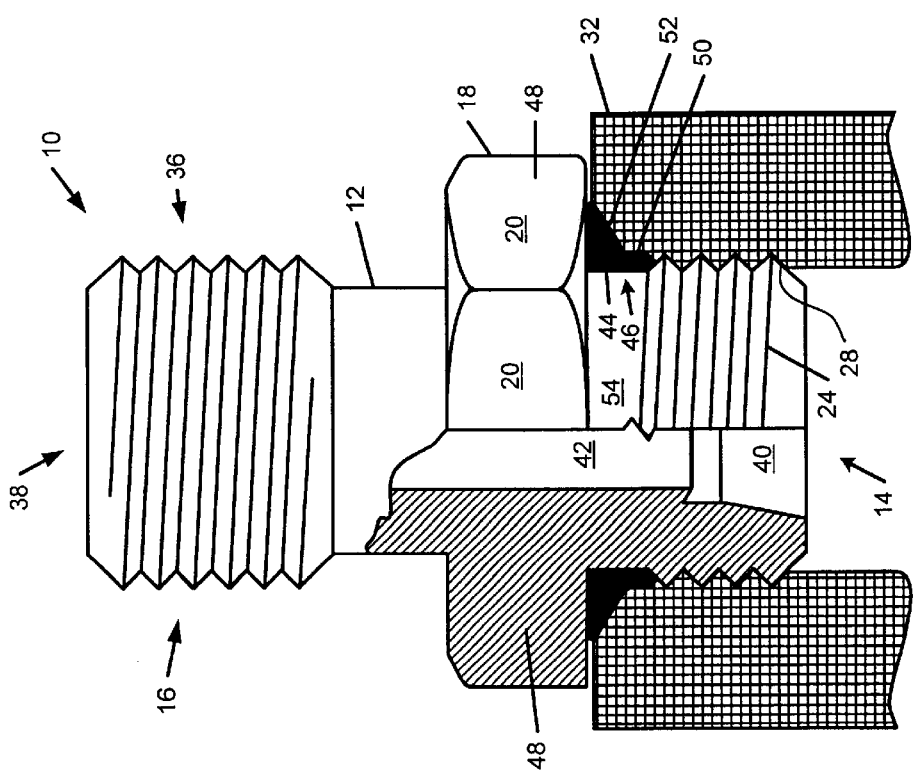
FIG. 1 is a partially cutaway side view of a union fitting employing an elastomeric O-ring that is constructed according to the prior art.

Referring now to FIG. 1, a union fitting 10 according to the prior art is illustrated. The union fitting 10 includes a body 12 and a boss-side end 14 and a tube-side end 16 which are located at opposite ends of the body 12. A central portion 18 is located between the ends 14 and 16 and includes one or more surfaces 20 which engage a tightening device (not shown) such as a wrench. The boss-side end 14 includes a plurality of threads 24 that are formed on an outer surface thereof and which engage corresponding threads 28 of a female boss 32.

The tube-side end 16 likewise includes threads 36 that are formed on an outer surface thereof and which are used to attach fluid system tubing using a nut (both not shown). The union fitting 10 includes a tube-side port 38, a boss-side port 40, and a bore 42 that connects the ports 28 and 40 so that fluid can pass through the union fitting 10 and the boss 32 to the hydraulic component. An elastomeric O-ring 44 is located in a cavity 46 that is defined between a radially projecting flange 48 of the center portion 18, a thread relief area 50 located adjacent the threads 28 of the female boss 32, a chamfered seat 52 located on a radially inner surface of the female boss 32, and a shank 54 of the union fitting 10.

In use, the elastomeric O-ring 44 is inserted over the boss-side end 14 and is moved against the flange 48 of the central portion 18. The threads 24 of the boss-side end 14 of the union fitting 10 are matingly received by the threads 28 of the female boss 32. A wrench engages the surfaces 20 of the central portion 18 to tighten the union fitting 10. As the union fitting 10 is tightened, the elastomeric O-ring 44 is deformed under strain, substantially fills the cavity 46, and provides a fluid-tight seal. The elastomeric O-ring 44 tends to deteriorate with age due to the strain, the temperature and the pressure that is encountered during use. Applications employing the union fitting 10 often have high fluid pressures which are applied and released frequently. The cycling of the elastomeric O-ring also contributes to the deterioration of the elastomeric O-ring 44.

Figure 2:
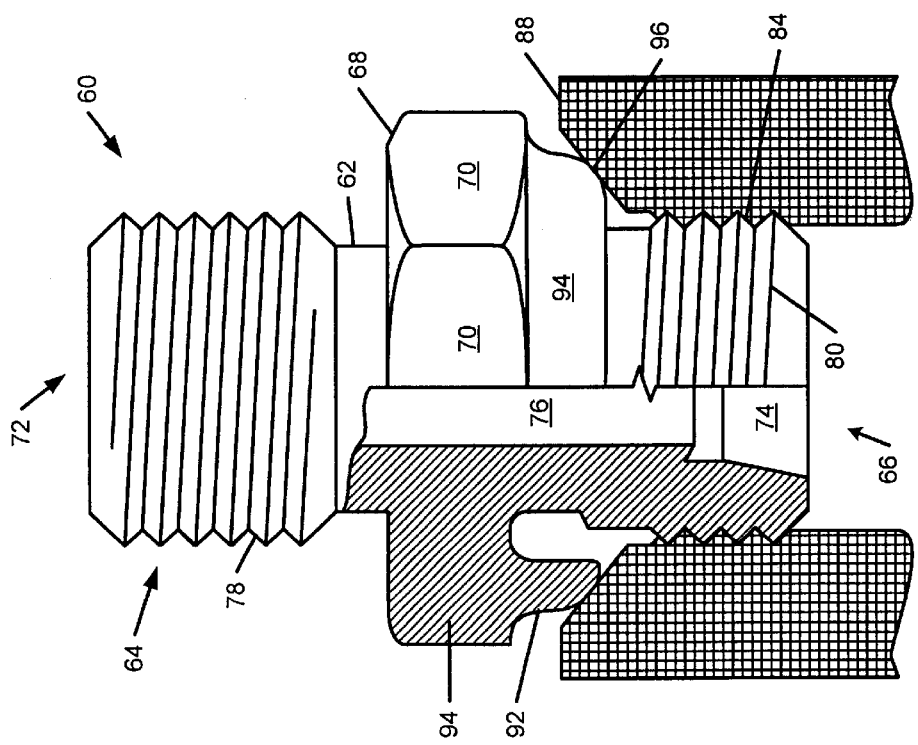
FIG. 2 is a partially cutaway side view of a lip seal union fitting that is constructed according to the prior art.

Referring now to FIG. 2, a lip seal union fitting 60 according to the prior art is illustrated and includes a body 62 with a tube-side end 64 and a boss-side end 66. A central portion 68 includes a plurality of surfaces 70 for engaging a tightening device (not shown) such as a wrench. The union fitting 60 includes a tube-side port 72, a boss-side port 74, and a bore 76 that connects the ports 72 and 74 so that fluid can pass through the union fitting 60 and the boss to the hydraulic component.

The tube-side end 64 includes a plurality of threads 78 for engaging a nut to attach a fluid tube (both not shown). The boss-side end 66 includes a plurality of threads 80 for engaging corresponding threads 84 on a female boss 88. A lip seal 92 extends towards the boss-side end 66 from a radial flange 94 of the central portion 68 and is biased in a radially inward direction by the chamfered surface or seat 96 of the female boss 88 when the union fitting 60 is tightened onto the boss 88. The lip seal 92 is formed integrally with the body 62 of the union fitting 10.

Since the lip seal 92 is made of the same material as the body 62 and is integrally formed with the body 62 of the union fitting 60, several problems arise. The material selected for the union fitting must be compatible with the material selected for the tubes and the boss. Since the boss is typically made of aluminum or aluminum alloy, problems such as galling and fretting occur if harder materials are selected for the union fitting. Problems also arise if steel, stainless steel, or titanium alloy are selected for the tubing due to galvanic corrosion between these materials and aluminum or aluminum alloy.

Figures 3, 4:
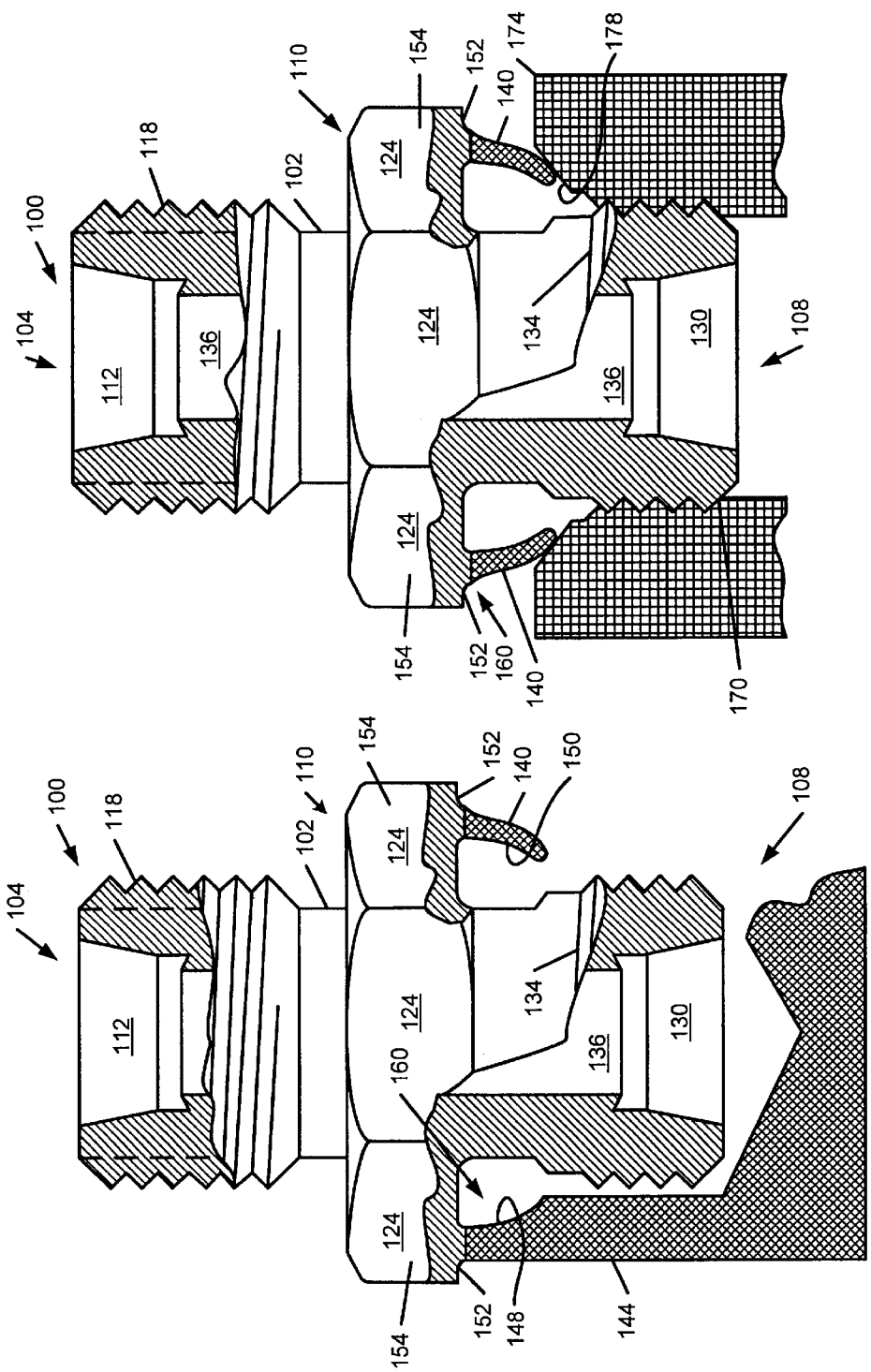
FIG. 3 is a partially cutaway side view of a lip seal union fitting and a cup-shaped or tubular welded part according to the invention.
FIG. 4 is a partially cutaway side view of a lip seal union fitting according to the invention.

Referring now to FIG. 3, a union fitting 100 according to a preferred embodiment of the present invention includes a body 102 with a tube-side end 104, a boss-side end 108, and a central portion 110. The tube-side end 104 includes a tube-side port 112 and threads 118 that are formed on an outer surface thereof. The central portion 110 includes a plurality of surfaces 124 for engaging a tightening device (not shown) such as a wrench. The boss-side end 108 includes a bore-side port 130 and threads 134 that are formed on an outer surface thereof. A bore 136 connects the tube-side port 112 and the boss-side port 130 so that fluid can pass through the union fitting 100 and the boss to a hydraulic component.

The body 102 of the lip seal union fitting 100 is preferably constructed of a first material that has a suitable strength for termination of fluid system tubing (not shown) that is connected to the tube-side end 104. In a preferred embodiment, the first material is selected from steel, stainless steel, or titanium alloy.

A lip seal 140 is constructed from a second material that is different than the first material that is chosen for the body 102 of the lip seal union fitting 100. The second material used to construct the lip seal 140 should be chosen to obtain maximum flexibility of the lip seal 140 to eliminate galling or fretting damage to the boss and to minimize the probability that over-tightening of the lip seal union fitting 100 will cause damage to the boss. Preferably, the boss and the lip seal 140 are made of materials having approximately the same material hardness. In a highly preferred embodiment, the lip seal 140 and the boss are made of the same material.

To construct the lip seal 140 according to the invention, a tubular or cup-shaped part 144 is employed. The part 144 has a shape that is suitable for holding by an inertia welding device (not shown). The part 144 includes an inner surface 148 that has the same shape as an inner surface 150 of the lip seal 140 to eliminate the need for machining of the inner surface 148 after welding. The tubular or cup-shaped part 144 is inertia welded to a boss-side surface 152 of a radial flange 154 of the central portion 110. An annular downwardly projecting surface 160 may be provided as a mating surface for welding the tubular or cup-shaped part 144.

In a preferred embodiment, the tubular or cup-shaped part 144 is constructed of aluminum or aluminum alloy. The tubular or cup-shaped part 144 is finish-machined after being inertia welded to obtain the final shape, concentricity and surface finish desired for the lip seal 140. Weld flash resulting from the inertia welding is also removed.

After completing the finish-machining and removing the weld flash, a final finish such as anodic finish or another suitable finish is added to the lip seal 140. The titanium, steel, and/or stainless steel that is used for the body 102 of the lip seal union fitting 100 either has no finish or a finish that would not be affected by the anodic process utilized on the lip seal 140.

Referring now to FIG. 4, in use the threads 134 located at the boss-side end 108 of the union fitting 100 are aligned with corresponding threads 170 of a female boss 174. The boss 174 is made of aluminum or aluminum alloy if galvanic corrosion and weight are primary concerns steel and/or stainless steel can also be used to construct the boss if strength, galling, and/or sealing are primary concerns. When an aluminum alloy lip seal is terminated on a steel or stainless steel boss, anodic or cadmium plate finishes are used to prevent corrosion due to galvanic coupling. As the lip seal union fitting 100 is rotated, the threads move the lip seal 140 against a chamfered face surface or seat 178 of the female boss 174. The seat 178 biases the lip seal 140 in a radially inward direction to create a fluid tight seal.

The lip seal union fitting according to the present invention improves the durability of union fittings by eliminating the need for primary or redundant seals provided by an elastomeric O-ring. Because the lip seal is made of aluminum or aluminum alloy, the present invention eliminates the problem of having a more expensive part (the boss) damaged by the less expensive part (the union fitting) when the union fitting is over-tightened.

The material selected for the body has high strength and fatigue resistance such that high strength tubing materials such as steel, stainless steel or titanium alloy may be successfully connected. The lip seal is made of a material that has a hardness that is less than or equal to the boss to prevent the lip seal union fitting from damaging the boss.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed:

1. A lip seal union fitting for a female boss that includes a bore, a first threaded portion located on an inner surface of said bore, and a seat comprising:
    a body that is constructed of a first material and includes a tube-side end, a boss-side end, and a central portion;
    a second threaded portion located on an outer surface of said boss-side end; and
    a lip seal that is constructed of a second material and is fixedly attached to said central portion of said body, that extends from said central portion of said body towards said boss-side end, and that includes an outer surface that engages said seat of said boss to create a fluid seal as said first and second threaded portions are rotatably engaged.

2. A lip seal union fitting for a female boss that includes a bore, a first threaded portion located on an inner surface of said bore, and a seat comprising:
    a body that is constructed of a first material and includes a tube-side end, a boss-side end, and a central portion;
    a second threaded portion located on an outer surface of said boss-side end; and
    a lip seal that is constructed of a second material, that extends from said central portion of said body towards said boss-side end, and that includes an outer surface that engages said seat of said boss to create a fluid seal as said first and second threaded portions are rotatably engaged, wherein said first material has a greater material hardness than said second material.

3. The lip seal union fitting of claim 1 wherein said lip seal is attached to said central portion using inertia welding.

4. The lip seal union fitting of claim 1 wherein said first material includes at least one material selected from the group consisting of steel, stainless steel and titanium alloy.

5. The lip seal union fitting of claim 1 wherein said central portion includes a first flange that projects in a radial direction from said body and a second flange that projects in an axial direction from a boss-side surface of said first flange.

6. The lip seal union fitting of claim 5 wherein said lip seal is connected to said body along said second flange.

7. The lip seal union fitting of claim 1 wherein said central portion includes a plurality of surfaces that are adapted to engage a tightening device.

8. The lip seal union fitting of claim 1 wherein said second material includes at least one material selected from the group consisting of aluminum and aluminum alloy.

9. The lip seal union fitting of claim 1 wherein said female boss is made of a third material that includes at least one material selected from the group consisting of aluminum, aluminum alloy, steel, and stainless steel.

10. The lip seal union fitting of claim 1 wherein said first material has a greater hardness than said second material.

11. The lip seal union fitting of claim 2 wherein said lip seal is attached to said central portion using inertia welding.

12. The lip seal union fitting of claim 2 wherein said first material includes at least one material selected from the group consisting of steel, stainless and titanium alloy.

13. The lip seal union fitting of claim 2 wherein said central portion includes a first flange that projects in a radial direction from said body and a second flange that projects in an axial direction from a boss-side surface of said first flange.

14. The lip seal union fitting of claim 13 wherein said lip seal union is connected to said body a long said second flange.

15. The lip seal union fitting of claim 2 wherein said central portion includes a plurality of surfaces that are adapted to engage a tightening device.

16. The lip seal union fitting of claim 2 wherein said second material includes at least one material selected from the group consisting of aluminum and aluminum alloy.

17. The lip seal union fitting of claim 2 wherein said female boss is made of a third material that includes at least one material selected from the group consisting of aluminum, aluminum alloy and steel stainless steel.

18. An assembly for attaching a fluid tube to a hydraulic component comprising:
    a female boss formed on said hydraulic component and including a bore, a first threaded portion located on an inner surface of said bore and a seat; and
    a lip seal union fitting that connects said fluid tube to said boss and included a body that is constructed of a first material and includes a boss-side end, a tube-side end, and a central portion, a second threaded portion located on an outer surface of said boss-side end, and a lip seal that is constructed of a second material that is fixedly attached to and extends from said central portion of said body towards said boss-side end, and that includes an outer surface that engages said seat as said first and second threaded portions are rotatably engaged, wherein said first material has a greater material hardness than said second material.

19. The lip seal union fitting of claim 18 wherein said lip seal is attached to said central portion using inertia welding.

20. The assembly of claim 18 wherein said first material includes at least one material selected from the group consisting of steel, stainless steel and titanium alloy and said second material includes at least one material selected from the group consisting of aluminum and aluminum alloy.

* * * * *